US012400147B2

(12) United States Patent
Mukherjee et al.

(10) Patent No.: US 12,400,147 B2
(45) Date of Patent: Aug. 26, 2025

(54) SCHEMA-BASED MACHINE LEARNING MODEL MONITORING

(71) Applicant: INTUIT INC., Mountain View, CA (US)

(72) Inventors: Manas Kumar Mukherjee, Mountain View, CA (US); Efraim David Feinstein, San Jose, CA (US); Sumanth Venkatasubbaiah, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/357,680

(22) Filed: Jul. 24, 2023

(65) Prior Publication Data

US 2025/0037012 A1 Jan. 30, 2025

(51) Int. Cl.
*G06N 20/00* (2019.01)

(52) U.S. Cl.
CPC .................... *G06N 20/00* (2019.01)

(58) Field of Classification Search
CPC .................................................. G06N 20/00
See application file for complete search history.

(56) References Cited

U.S. PATENT DOCUMENTS

| | | | | |
|---|---|---|---|---|
| 2009/0164515 A1* | 6/2009 | Wang | .................. | G06F 8/36 |
| 2017/0235848 A1* | 8/2017 | Van Dusen | .......... | G06Q 10/101 |
| | | | | 705/12 |
| 2020/0133964 A1* | 4/2020 | Lee | .................. | G06F 16/355 |
| 2021/0081377 A1* | 3/2021 | Polleri | .................. | H04L 9/0894 |
| 2022/0148695 A1* | 5/2022 | Boussios | .................. | G06N 20/00 |
| 2022/0215243 A1* | 7/2022 | Narayanaswami | .................. | |
| | | | | G06F 18/2193 |
| 2023/0161814 A1* | 5/2023 | McCarson | .................. | G06F 18/24155 |
| | | | | 703/2 |

OTHER PUBLICATIONS

Trung, Bui Duc, Ngo Tung Son, Nguyen Duy Tung, Kieu Anh Son, Bui Ngoc Anh, and Phan Truong Lam. "Educational Data Mining: A Systematic Review on the Applications of Classical Methods and Deep Learning Until 2022." In 2023 IEEE Symposium on Industrial Electronics & Applications (ISIEA), pp. 1-15. IEEE (Year: 2023).*
Zliobaite, Indre, Mykola Pechenizkiy, and Joao Gama. "An overview of concept drift applications." Big data analysis: new algorithms for a new society (2016): 91-114. (Year: 2016).*

* cited by examiner

*Primary Examiner* — Casey R. Garner
(74) *Attorney, Agent, or Firm* — Patterson + Sheridan, LLP (57) ABSTRACT

The present disclosure provides techniques for schema-based machine learning model monitoring. One example method includes receiving input data to and output data related to a machine learning model, wherein the input data and the output data conform to a data schema, retrieving, based on the data schema, a set of fields associated with the input data and the output data, performing statistical analysis for the machine learning model based on the set of fields retrieved, and predicting one or more attributes of the machine learning model based on the statistical analysis, wherein the one or more attributes of the machine learning model indicate a result of monitoring of the machine learning model, explainability information related to the machine learning model, or health of the machine learning model.

13 Claims, 4 Drawing Sheets

SCHEMA-BASED MACHINE LEARNING MODEL MONITORING

Aspects of the present disclosure relate to schema-based machine learning model monitoring.

Organizations are increasingly developing machine learning models to assist their operations. Machine learning models can be integrated into platforms or services that process input requests in order to output responses. While machine learning models usually take input features and output predictions, the platforms or services instead take input requests and output responses to the requests. Input requests may include additional information augmenting the input features while the responses may include additional information augmenting the predictions. For example, an input request may indicate additional information (e.g., an identifier) other than an input feature to a machine learning model. Similarly, an output response may include additional information (e.g., a timestamp) other than the prediction generated by a machine learning model.

Monitoring relevant information, such as the input features to and the output predictions from a machine learning model, can help ensure the performance and accountability of such a machine learning model. However, existing machine learning model management and monitoring services usually do not automatically recognize the relevant information. Users (e.g., data scientists) of such services often rely instead on manually identifying or retrieving relevant parts of the input requests or the output responses. However, this process is prone to errors, resulting in the waste of precious time and manpower and, consequently, suboptimal performance of platforms or services that use machine learning models.

Accordingly, improved systems and methods are needed for monitoring the inputs to and outputs from machine learning models.

BRIEF SUMMARY

Certain embodiments provide a method for schema-based machine learning model monitoring. The method generally includes receiving input data to and output data related to a machine learning model, wherein the input data or the output data includes a plurality of fields, wherein the input data and the output data conform to a data schema, and wherein the data schema indicates, for each field of the plurality of fields of the input data or the output data, a type for the field, a level of monitoring for the field, or a level of secrecy associated with the field, retrieving, based on the data schema, a set of fields associated with the input data and the output data, wherein the set of fields includes one or more input features to the machine learning model and one or more outputs from the machine learning model, performing statistical analysis for the machine learning model based on the set of fields retrieved, and predicting one or more attributes of the machine learning model based on the statistical analysis, wherein the one or more attributes of the machine learning model indicate a result of monitoring of the machine learning model, explainability information related to the machine learning model, or health of the machine learning model.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for schema-based machine learning model monitoring.

During the development of a machine learning model, users (e.g., data scientist) often have to assess the performance of the machine learning model for multiple rounds. The development cycle of a machine learning model often involves revising a machine learning model, sometimes including addition or deletion of certain input features or output predictions, possibly over a long period of time.

In addition, the machine learning model is usually integrated into a machine learning service or platform, which may parse extra information other than the input features to and the output predictions from the machine learning model. Parsing the extra information requires monitoring to ensure that the service or platform runs smoothly.

To monitor the machine learning model and the associated machine learning service or platform, data (e.g., the input requests and the output responses) are often stored in a database for easy access. Users often have to monitor and analyze specific information (e.g., fields) from past data (e.g., historical input requests and corresponding historical output responses) for a specific monitoring task.

Existing techniques for monitoring machine learning models often focus only on enforcing certain formats for the input features and the output predictions, such as using schemas. However, without clear indications of the parts of the stored data, users often need to manually determine relevant parts of the stored data (e.g., by referring to the architecture of the machine learning model), resulting in the waste of manpower and computational resources.

While conventional machine learning model monitoring techniques rely on manual identification from users, embodiments of the present disclosure automatically recognize and retrieve relevant parts of the stored data (e.g., input requests and the corresponding output responses) used to monitor and analyze a machine learning model or the associated machine learning service or platform.

Input requests or output responses often include a plurality of fields. A schema can indicate (e.g., annotate), for each field of an input request or an output response, a type (e.g., purpose) for the field, a level of monitoring for the field, or a level of secrecy associated with the field. The type for the field, the level of monitoring for the field, or a level of secrecy associated with the field can be indicators for a downstream analysis task that would analyze or monitor the information in the field.

As such, for each field, the schema not only enforces a certain format for the field but delineates whether the field is relevant for one or more downstream analysis tasks. For example, the schema may indicate that a field is an input feature to the machine learning model and the field has numerical data, which is used to analyze the accuracy of the machine learning model in a downstream analysis task. Details regarding using the schema can be found below with respect to FIGS. 1-2.

Based on the schema, relevant information (e.g., fields) needed to perform one or more downstream analysis tasks can be automatically recognized and retrieved from the stored data. For example, a query can be built based on the schema to retrieve relevant information needed to perform a downstream analysis task from the stored data. In some examples, to expedite the process, a query is built to retrieve all relevant information needed in all of the downstream analysis tasks.

The downstream analysis tasks can process the retrieved information to predict attributes related to several aspects of the machine learning model, such as a result of monitoring of the machine learning model, explainability information related to the machine learning model, or health (e.g., integrity in performance) of the machine learning model. In addition, these aspects can be used to infer the status or performance of the associated machine learning service or platform. The downstream analysis tasks can include machine learning tasks.

Accordingly, by augmenting schemas to indicate a more comprehensive list of annotations and commands, techniques described herein allow for machine learning model monitoring to automatically identify and retrieve relevant information for downstream analysis tasks. Such downstream analysis tasks further allow for faster, more convenient, and more accurate monitoring of the machine learning model and its associated service or platform. For example, by indicating information in a field is used in a downstream analysis task, embodiments of the present disclosure reduce the need for human supervision by automatically recognizing that the field is relevant for a downstream analysis task and retrieving the information in the field for the downstream analysis task. In addition, the comprehensive list of annotations and commands would grant users a significant degree of freedom to denote relevant parts of information (e.g. fields) of the input requests or the output responses for downstream analysis and specific computations to be performed on the relevant parts.

As a result, the schema-based machine learning model monitoring can allow for convenient denotation of complex data as well as simplify the workflow by automating retrieval of information and analysis of the retrieved information. Accordingly, embodiments of the present disclosure avoid inefficiencies associated with suboptimal identification and retrieval of critical information and improve the accuracy of automated monitoring of machine learning models and their associated services or platforms. By using an augmented schema as described herein to automatically recognize and retrieve relevant parts of the stored data (e.g., input requests and the corresponding output responses), embodiments of the present disclosure allow a computing application to do what it could not do before: namely, effective automated monitoring and analyzing of a machine learning model or the associated machine learning service or platform.

Example Data Parser for Schema-Based Machine Learning Model Monitoring

Figure 1:
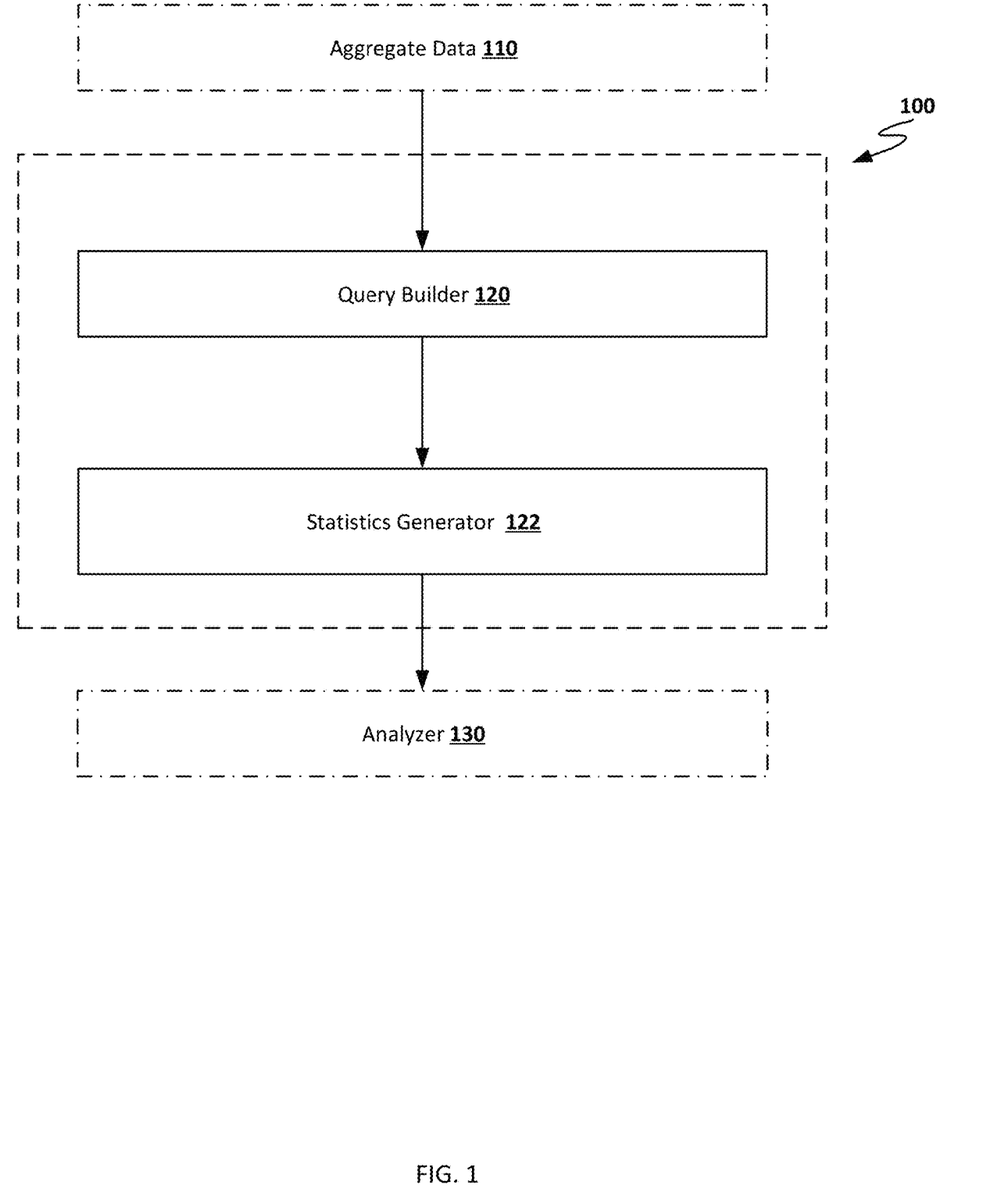
FIG. 1 depicts an example data parser for schema-based machine learning model monitoring.

FIG. 1 depicts an example data parser 100 for schema-based machine learning model monitoring. Although discussed with respect to one specific machine learning model, data parser 100 can parse data for any appropriate machine learning models. For simplicity, in the following discussion, the machine learning model is assumed to be integrated into a machine learning service or platform.

Data parser 100 processes aggregated data 110. Aggregated data 110 can indicate input data (e.g., input requests) and the corresponding output data (e.g., the corresponding output responses) from a machine learning service or platform, which includes a machine learning model. In some examples, aggregate data 110 can be stored in a database, such as a relational database, for easy and resource-efficient access.

Aggregated data 110 can include a plurality of fields. In addition, aggregated data 110 can conform to a data schema. In some examples, the schema is embedded in aggregate data 110, such as comments. In some examples, alternatively, the schema is received as a file separately from aggregate data 110 by query builder 120, such as a YAML Ain't Markup Language (YAML) file, an extensible markup language (XML) file, a python script, or a JavaScript object notation (JSON) file. In some examples, the schema is generated from a runtime script (e.g., a python runtime script) to a desired format using appropriate tools (e.g., FastAPI)

The data schema may indicate, for each field of aggregate data 110, a type for the field, a level of monitoring for the field, or a level of secrecy associated with the field. In some examples, the type for the field indicates one of an entity (e.g., an identifier) associated with the field, metadata associated with the data, a timestamp associated with the data, a feature indication specifying that the field corresponds to an input feature to the machine learning model, a primary key (e.g., an identifier) for the output data, a desired format for the model output (e.g., model prediction) of the output data, an explanation structure for the model output of the output data, a level of confidence associated with the machine learning model when generating the model output, or an error message associated with the data. The indications can be related to downstream analysis tasks designed to analyze and monitor the performance of the machine learning model, as discussed below.

In such examples, the desired format for the model output of the output data comprises one of a numerical value, a series of numerical values (e.g., a time series), a regression output (e.g., a vector), a categorical output, a string, or a dictionary (e.g., representing key-value pairs).

In such examples, additionally, the explanation structure for the model output of the output data indicates one of a set of features contributing most to the model output of the output data (e.g., dominant features), a respective set of features contributing most to the model output of the output data and associated weights of the respective set of features (e.g., dominant features with feature importance), or a natural language explanation of the model output of the output data.

In such examples, additionally, the feature indication further specifies a data type (e.g., a string, a numerical value, and so on) for the field.

In some examples, the level of monitoring for the field indicates an exclusion of the field from monitoring or a set of downstream computations to be excluded for the field in the statistical analysis.

In some examples, the level of secrecy associated with the field indicates one of a public, restricted, sensitive, highly sensitive, or secret level.

As such, in addition to enforcing certain formats on the fields, the comprehensive list of annotations and commands available in the schema to the users (e.g., data scientists) can help users to specify, for each field, whether the field is related to one or more downstream analysis tasks and how to analyze information in the field for the tasks. The expanded options and utilities offered by the schema can help users indicate (e.g., annotate) fields of interest and automate analysis and monitoring of the fields.

Aggregate data 110 can be provided as the input to query builder 120 to retrieve information (e.g., relevant fields in aggregate data 110) for one or more downstream analysis tasks related to the analysis of aspects of the machine learning model. Query builder 120 can construct a query based on the schema to retrieve information for the downstream analysis tasks. For example, a query can be built based on the schema to retrieve relevant information for a downstream analysis task from aggregate data 110. In some examples, to expedite the process, a query is built to retrieve all relevant information needed in all of the downstream tasks from aggregate data 110.

In some examples, query builder 120 first identifies relevant information (e.g., fields) in aggregate data 110 based on the schema, and then constructs a query to retrieve the relevant fields from aggregate data 110. The relevant fields may be automatically recognized (e.g., using appropriate tools such as a crawler or a natural language processing model) by query builder 120.

The retrieved information may be organized into an easily readable format, such as a matrix or a Pandas Dataframe. For example, each column of the retrieved information corresponds to a field in aggregate data 110. In some examples, each column of the retrieved information also indicates a type for the column (e.g., as the type for the corresponding field), a level of monitoring for the column (e.g., the level of monitoring for the corresponding field), or a level of secrecy associated with column (e.g., or the level of secrecy associated with the corresponding field). Details regarding query building and information retrieval can be found below with respect to FIG. 2.

The downstream analysis tasks can relate to several aspects of the machine learning model, such as a result of monitoring of the machine learning model, explainability information related to the machine learning model, or health (e.g., integrity in performance) of the machine learning model. In some examples, the downstream analysis tasks include analysis tasks using machine learning. The downstream tasks can be performed by analyzer 130 as discussed below.

The retrieved information can be provided as the input to statistics generator 122 to generate statistics for each column of the retrieved information (e.g., corresponding to a field in aggregate data 110). Statistics generator 122 can perform statistical analysis on each column of the retrieved information according to the data type indicated in the column. The data type for a column can be embedded in the column or automatically recognized by statistics generator 122.

For example, when the data type of the retrieved information indicates numeric values, statistical descriptors (e.g., a minimum, an average, a maximum, a standard deviation, a skewness, or a kurtosis) may be calculated by statistics generator 122. Likewise, when the data type indicates categorical values, category frequency may instead be calculated. Furthermore, when the data type indicates string data (e.g., texts), string data descriptors, such as string length or common words, may be calculated instead. Details regarding statistics for the retrieved information can be found below with respect to FIG. 2.

Additionally, statistics generator 122 may perform statistical analysis on each column of the retrieved information according to the level of monitoring indicated in the column. Following the example above, a column having numerical values as the data type may also have a level of monitoring indicating a set of downstream computations (e.g., a maximum, a minimum, or the like) to be excluded for the column in the statistical analysis. As such, statistics generator 122 would not compute the excluded downstream computations for the column. In addition, a column (e.g., indicating identifiers) may be excluded from monitoring, such that no computation or analysis will be performed on the column.

The statistics for the columns can then be provided as the input to analyzer 130 to perform downstream analysis tasks, as discussed above. The downstream analysis tasks may predict one or more attributes for the machine learning model, where the one or more attributes of the machine learning model indicate a result of monitoring of the machine learning model, explainability information related to the machine learning model, or health of the machine learning model, as discussed above. In some examples, the one or more attributes are predicted using machine learning models (e.g., regression models, neural networks, gradient boosted trees, random forests, and so on).

Analyzer 130 can analyze the statistics computed for the columns (e.g., individually or holistically) with respect to the downstream analysis tasks. For example, some of the downstream analysis tasks include monitoring request data, evaluating machine learning model performance, screening for outliers, and so on.

In an example, to predict an attribute indicating the result of monitoring of the machine learning model, analyzer 130 analyzes the statistics of each column according to the level of monitoring for the column (e.g., to spot outliers). In this example, analyzer 130 includes a model monitoring service (MMS).

In another example, to predict an attribute indicating the explainability information related to the machine learning model, analyzer 130 analyzes the statistics of the columns with respect to the explanation structure indicated in the output data in aggregate data 110. For example, analyzer 130 can generate explanations regarding the model prediction according to the explanation structure (e.g., dominant features, dominant features with feature importance weights, or a natural language explanation), as discussed above.

The attribute indicating the explainability information can include a global feature importance (e.g., relating to all instances) or a local feature importance (e.g., relating to one specific instance). The global or local feature importance can be computed using Shapley values of the respective features.

In yet another example, to predict an attribute indicating the health of the machine learning model (or the associated machine learning service or platform), analyzer 130 analyzes the statistics related to the errors indicated in the output responses. For example, if an error rate (e.g., a number of errors within a pre-determined period of time) in the responses meets a threshold value, the predicted attribute may indicate a low level of health for the machine learning model. If it is determined that a machine learning model has a low level of health, action may be taken to improve the health of the machine learning model, such as by re-training the machine learning model using updated training data. For example, the machine learning model may be re-trained through a supervised learning process that involves providing training inputs to the model, receiving outputs from the model in response to the training inputs, comparing the outputs to known labels associated with the training inputs, and iteratively adjusting parameters of the model based on the comparing (e.g., in order to optimize an objective function such as a cost function). Thus, automated monitoring and analysis of machine learning models as described herein can result in improved functioning of such machine learning models through identification and remediation of issues, such as through re-training of machine learning models.

Example Workflow for Schema-Based Machine Learning Model Monitoring

Figure 2:
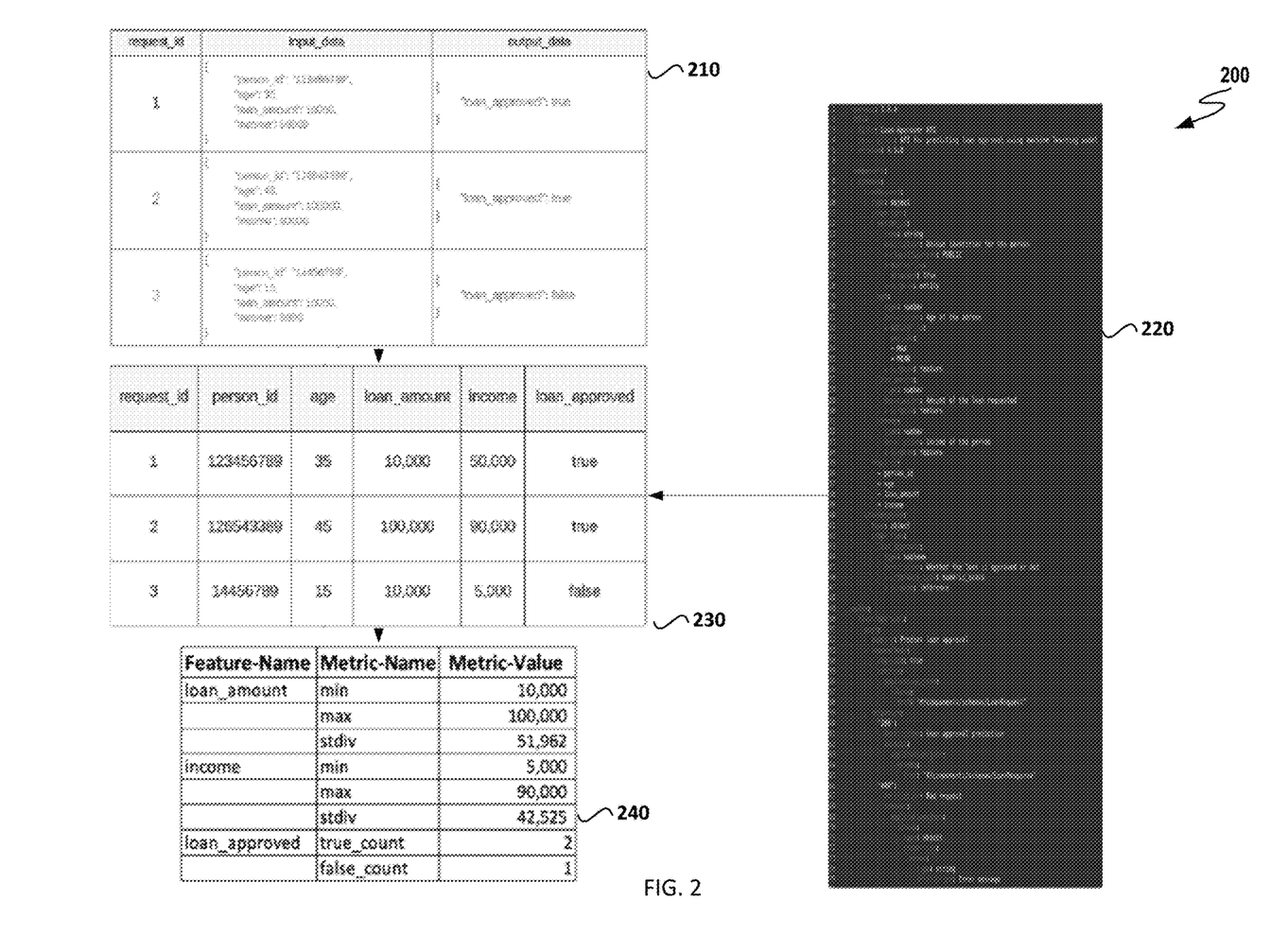
FIG. 2 depicts an example workflow for schema-based machine learning model monitoring.

FIG. 2 depicts an example workflow 200 for schema-based machine learning model monitoring. Although discussed with respect to one specific machine learning model, workflow 200 can be applied to any suitable machine learning model. For simplicity, the machine learning model is assumed to be integrated in a machine learning service or platform. In addition, though a specific dataset and a specific schema are depicted in workflow 200, workflow 200 can accommodate to any suitable datasets or schemas, according to the associated machine learning model.

Workflow 200 can be applied to analyze the input requests to and output responses from a machine learning service or platform. In this example, the machine learning service or platform includes a machine learning model designed to predict whether a loan request will be approved or denied.

As depicted, workflow 200 receives data 210 and schema 220. For example, data 210 can be aggregate data 110 as depicted in FIG. 1 whereas schema 220 can be the schema discussed with respect to FIG. 1.

Data 210 indicates several requests (e.g., as indicated in "request_id" column). Each request includes an input data to the machine learning model (e.g., as indicated in "input_data" column) and the output data from the machine learning model (e.g., as indicated in "output_data" column). The input data as depicted has 4 fields, namely "person_id" in string values, as well as "age," "loan_amount," and "income" in numerical values. Similarly, the output data as depicted has only 1 field, namely "loan_approved," which indicates categorical values (e.g., binary Boolean values). Data 210 can be stored in a relational database, such as a MySQL database.

Schema 220 is depicted as a YAML Ain't Markup Language (YAML) file. However, alternatively, schema 220 can be an extensible markup language (XML) file, a python script, a JavaScript object notation (JSON) file, or another suitable file. Alternatively, schema 220 can be embedded in data 210, such as comments. In addition, though schema 220 is depicted as using OpenAPI annotations, schema 220 can annotate fields using any appropriate annotations.

Schema 220 indicates, for each field of the input data and output data, a type for the field (e.g., through "x-purpose"), a level of monitoring for the field (e.g., through "x-monitoring"), or a level of secrecy associated with the field (not shown). In this example, the fields of "age," "loan_amount," and "income" are input features (e.g., having "x-purpose" as "feature") whereas the "person_id" field is additional information (e.g., an identifier with "x-purpose" as "entity") rather than an input feature.

As depicted, for some fields in schema 220, the level of monitoring for the field can indicate exclusion from certain downstream computations. For example, the "x-monitoring" of the "age" field indicates the maximum value and the mean value of the field to be excluded from downstream computations (e.g., through "MAX" and "MIN" under "exclude"). In addition, in this example, the level of monitoring for the "person_id" field indicates that the field is excluded from monitoring all together, as the "person_id" field only includes identifiers.

Workflow 200 can first recognize a set of fields to be retrieved from data 210 based on schema 220 and one or more downstream tasks to be performed. In this example, the downstream task relates to assessing the performance (e.g., accuracy) of the machine learning model. As such, workflow 200 identifies that the "request_id," "person_id," "age," "loan_amount," "income," and "loan_approved" fields are relevant to the tasks. Workflow 200 can then build a query to retrieve these fields from data 210. Identifying the relevant fields and building the query can be performed by a query builder, such as query builder 120 depicted in FIG. 1.

The retrieved fields can be organized into retrieved information 230. As depicted, retrieved information 230 is represented using a Pandas Dataframe. However, other suitable data structures can be used to represent retrieved information 230, such as a matrix or a table. As depicted, each column of retrieved information 230 corresponds to a field in data 210. For example, the "age" column in retrieved information 230 correspond to the "age" field in data 210. In this example, retrieved information 230 is indexed by "request_id," similar to data 210.

Workflow 200 can perform statistical analysis on retrieved information 230 to generate statistics 240, based on the requirements (e.g., the type of the column, the level of monitoring for the column, and the level of secrecy for the column) indicated in schema 220, where the requirements are often associated with downstream analysis tasks. In this example, one specific downstream task involves the "loan_amount," "income," and "loan_approval" columns. As such, statistics 240 represent statistics computed for these columns. Computing the statistics can be performed by a statistics generator, such as statistics generator 122 depicted in FIG. 1.

In this example, the "loan_amount" and "income" columns include numerical values (e.g., as specified in schema 220 with "type" as "number"), whereas the "loan_approval" column include categorical values (e.g., as specified in schema 220 with "type" as "boolean"). For each data type, as depicted, workflow 200 can compute a set of statistics.

In this example, for a column with numerical values (e.g., the "loan_amount" or "income" column), a minimum, a maximum, and a standard deviation is computed for the column, as depicted. Similarly, for a column with categorical values (e.g., the "loan_approval" column), category frequency for the column is computed, as depicted.

In addition, string data descriptors (e.g., string length or common words) can be computed for a column with strings (not shown). Furthermore, if a column indicates exclusion from monitoring (e.g., the "person_id" column as discussed above), it is excluded from the analysis and the computations instead.

Statistics 240 can be used to analyze the aspects (e.g., by predicting several attributes) of the machine leaning model or the associated machine learning service or platform, as discussed with respect to FIG. 1.

Example Operations for Schema-Based Machine Learning Model Monitoring

Figure 3:
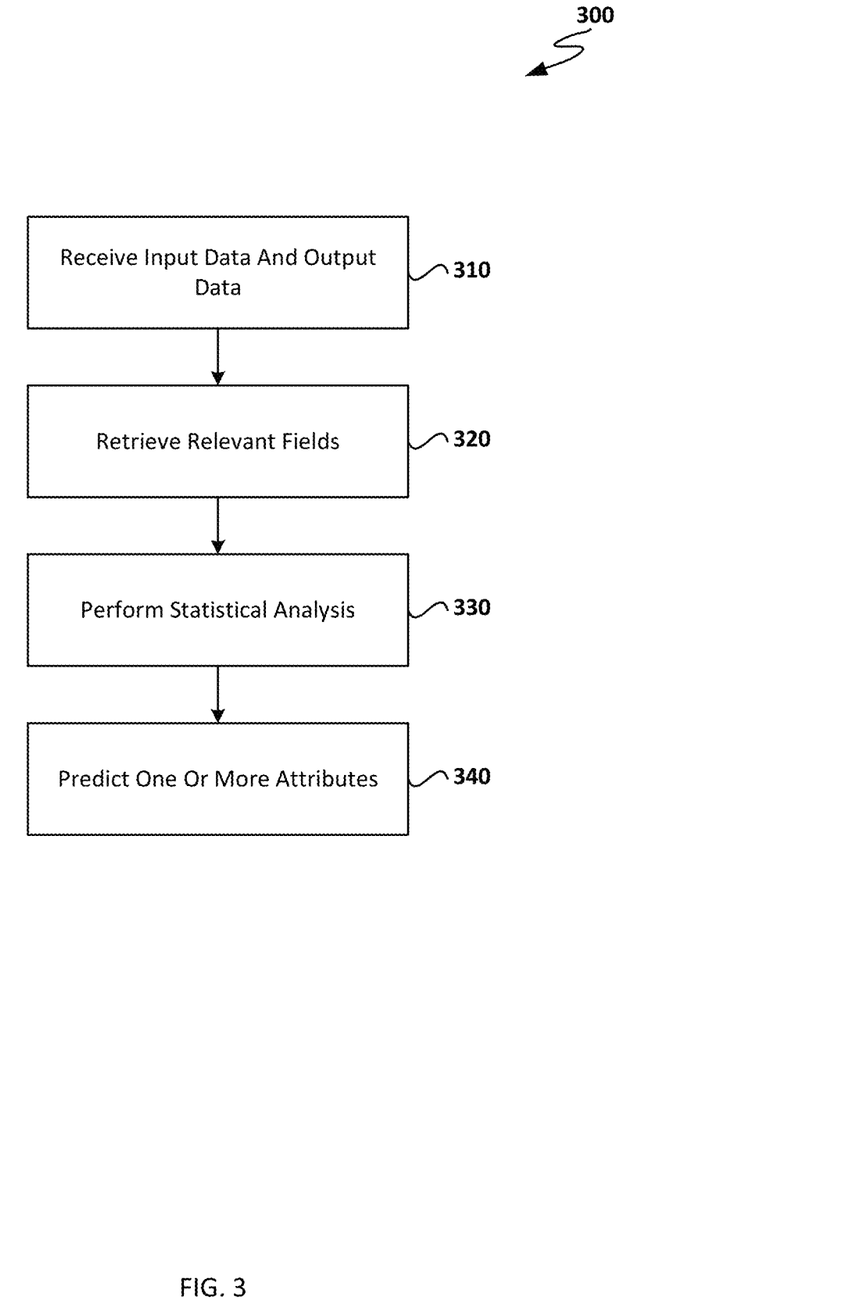
FIG. 3 is a flow diagram of example operations for schema-based machine learning model monitoring.

FIG. 3 is a flow diagram of example operations 300 for schema-based machine learning model monitoring. Operations 300 may be performed by a data parser, such as data parser 100 as illustrated in FIG. 1.

Operations 300 begin at 310, where input data to and output data related to a machine learning model is received, wherein the input data or the output data includes a plurality of fields, wherein the input data and the output data conform to a data schema, and wherein the data schema indicates, for each field of the plurality of fields of the input data or the output data, a type for the field, a level of monitoring for the field, or a level of secrecy associated with the field. For example, the input data and output data can be aggregate data 110 depicted in FIG. 1 or data 210 depicted in FIG. 2 and the data schema can be the schema discussed with respect to FIG. 1 or schema 220 depicted in FIG. 2.

In some embodiments, the type for the field indicates one of an entity (e.g., an identifier) associated with the field, metadata associated with the data, a timestamp associated with the data, a feature indication specifying that the field corresponds to an input feature to the machine learning model, a primary key (e.g., an identifier) for the output data, a desired format for the model output (e.g., model prediction) of the output data, an explanation structure for the model output of the output data, a level of confidence associated with the machine learning model when generating the model output, or an error message associated with the data.

In such embodiments, the desired format for the model output of the output data comprises one of a numerical value, a series of numerical values (e.g., a time series), a regression output (e.g., a vector), a categorical output, a string, or a dictionary (e.g., representing key-value pairs).

In such embodiments, additionally, the explanation structure for the model output of the output data indicates one of a set of features contributing most to the model output of the output data (e.g., dominant features), a respective set of features contributing most to the model output of the output data and associated weights of the respective set of features (e.g., dominant features with feature importance), or a natural language explanation of the model output of the output data.

In such embodiments, additionally, the feature indication further specifies a data type (e.g., a string, a numerical value, and so on) for the field.

In some embodiments, the level of monitoring for the field indicates an exclusion of the field from monitoring or a set of downstream computations to be excluded for the field in the statistical analysis.

In some embodiments, the level of secrecy associated with the field indicates one of a public, restricted, sensitive, highly sensitive, or secret level.

In some embodiments, the data schema is represented using a YAML Ain't Markup Language (YAML) file, an extensible markup language (XML) file, a python script, or a JavaScript object notation (JSON) file. In some embodiments, alternatively, the data schema is generated based on a runtime script (e.g., a python runtime script) using an appropriate tool (e.g., FastAPI).

At 320, a set of fields associated with the input data and the output data are retrieved based on the data schema, wherein the set of fields includes one or more input features to the machine learning model and one or more outputs (e.g., output predictions) from the machine learning model. For example, the set of fields can be retrieved by a query builder, such as query builder 120 as depicted in FIG. 1, and the set of fields can be retrieved information 230 as depicted in FIG. 2.

At 330, statistical analysis is performed for the machine learning model based on the set of fields retrieved. For example, the statistical analysis can be performed by statistics generator 122 as depicted in FIG. 1.

In some embodiments, performing statistical analysis for the machine learning model comprises one or more of computing statistical descriptors related to a field having numerical values, wherein the statistical descriptors include a minimum, an average, a maximum, a standard deviation, a skewness, or a kurtosis, computing category data descriptors related to a field having categorical values, wherein category data descriptors include category frequency, and computing string data descriptors related to a field having string data, wherein string data descriptors include string length or common words. For example, the descriptors can be found in statistics 240 as depicted in FIG. 2.

At 340, one or more attributes of the machine learning model are predicted based on the statistical analysis, wherein the one or more attributes of the machine learning model indicate a result of monitoring of the machine learning model, explainability information related to the machine learning model, or health of the machine learning model. For example, the one or more attributes can be predicted by analyzer 130 as depicted in FIG. 1. In some embodiments, the one or more attributes are predicted using machine learning models.

In some embodiments, the attribute indicating explainability information related to the machine learning model comprises a global feature importance or a local feature importance, as discussed with respect to FIG. 1.

Example Application Server

Figure 4:
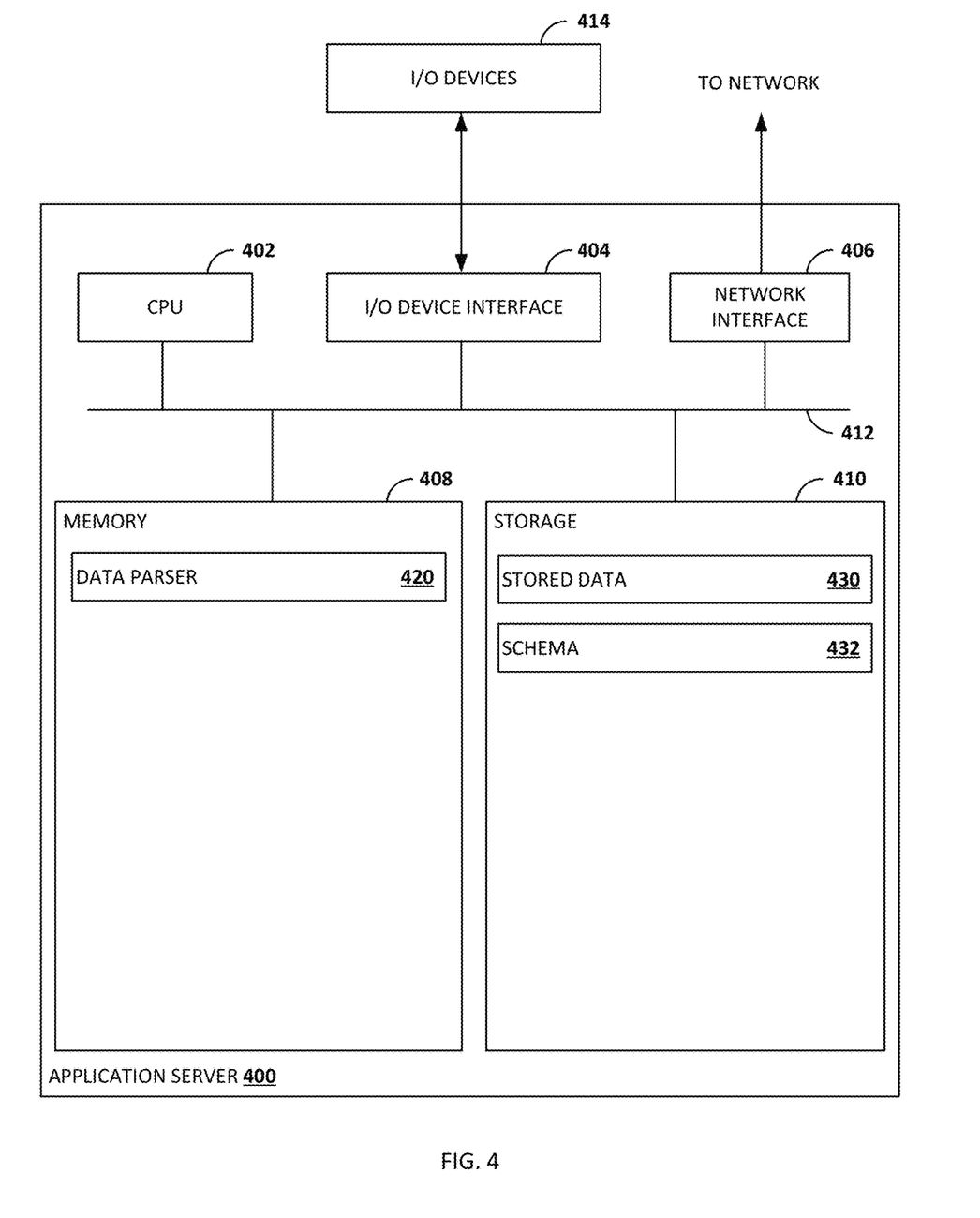
FIG. 4 depicts an example application server related to embodiments of the present disclosure.

FIG. 4 depicts an example application server 400, which can be used to deploy data parser 100 of FIG. 1. As shown, application server 400 includes a central processing unit (CPU) 402, one or more input/output (I/O) device interfaces 404, which may allow for the connection of various I/O devices 414 (e.g., keyboards, displays, mouse devices, pen input, etc.) to application server 400, a network interface 406, a memory 408, a storage 410, and an interconnect 412.

CPU 402 may retrieve and execute programming instructions stored in memory 408. Similarly, CPU 402 may retrieve and store application data residing in memory 408. Interconnect 412 transmits programming instructions and application data, among CPU 402, I/O device interface 404, network interface 406, memory 408, and storage 410. CPU 402 is included to be representative of a single CPU, multiple CPUs, a single CPU having multiple processing cores, and the like. I/O device interface 404 may provide an interface for capturing data from one or more input devices integrated into or connected to application server 400, such as keyboards, mice, touchscreens, and so on. Memory 408 may represent a random access memory (RAM), while storage 410 may be a solid state drive, for example. Although shown as a single unit, storage 410 may be a combination of fixed and/or removable storage devices, such as fixed drives, removable memory cards, network attached storage (NAS), or cloud-based storage.

As shown, memory 408 includes data parser 420. Data parser 420 may be the same as or substantially similar to data parser 100 of FIG. 1.

As shown, storage 410 includes stored data 430 or optionally, schema 432. Stored data 430 may be the same as or substantially similar to aggregate data 110 of FIG. 1 or data 210 of FIG. 2, whereas schema 432 may be the same as or substantially similar to schema 220 of FIG. 1.

It is noted that the components depicted in application server 400 are included as examples, and other types of computing components may be used to implement techniques described herein. For example, while memory 408 and storage 410 are depicted separately, components depicted within memory 408 and storage 410 may be stored in the same storage device or different storage devices associated with one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
augmenting a data schema to include, for each field of a plurality of fields:
an explanation structure for outputs of a machine learning model;
a level of monitoring for the field, wherein the level of monitoring comprises an indication of whether the field is included in one or more computations related to statistical analysis; or
a level of secrecy associated with the field, wherein the level of secrecy comprises one of a public, restricted, sensitive, highly sensitive, or secret level;
retrieving, based on the data schema, a set of fields from an aggregated data set comprising input data that was previously provided to the machine learning model and output data that was previously received from the machine learning model in response to the input data, wherein the set of fields includes one or more input features to the machine learning model and one or more outputs from the machine learning model, wherein the aggregated data set conforms to the data schema;
performing statistical analysis for the machine learning model based on the set of fields retrieved;
predicting a level of health of the machine learning model based on the statistical analysis; and
re-training the machine learning model through a supervised learning process using training data that has been updated based on the predicting of the level of health indicating a low level of health for the machine learning model, wherein the supervised learning process comprises:
providing training inputs to the machine learning model,
receiving outputs in response to the training inputs,
comparing the outputs to known labels associated with the training inputs, and
iteratively adjusting parameters of the machine learning model based on the comparing.

2. The method of claim 1, wherein the explanation structure for the outputs of the machine learning model indicates one of:
a set of features contributing most to the outputs;
a respective set of features contributing most to the outputs and associated weights of the set of features; or
a natural language explanation of the outputs.

3. The method of claim 1, wherein the level of monitoring for the field indicates an exclusion of the field from monitoring or a set of downstream computations to be excluded for the field in the statistical analysis.

4. The method of claim 1, wherein performing statistical analysis for the machine learning model comprises one or more of:
computing statistical descriptors related to a field having numerical values, wherein the statistical descriptors include a minimum, an average, a maximum, a standard deviation, a skewness, or a kurtosis;
computing category data descriptors related to a field having categorical values, wherein category data descriptors include category frequency; or
computing string data descriptors related to a field having string data, wherein string data descriptors include string length or common words.

5. The method of claim 1, further comprising predicting an attribute indicating explainability information related to the machine learning model, wherein the explainability information comprises a global feature importance or a local feature importance.

6. The method of claim 1, wherein the data schema is represented using a YAML Ain't Markup Language (YAML) file, an extensible markup language (XML) file, a python script, or a JavaScript object notation (JSON) file.

7. The method of claim 1, wherein the one or more computations involve monitoring request data, evaluating performance of the machine learning model, or screening for outliers.

8. A system, comprising:
a memory including computer-executable instructions; and
a processor configured to execute the computer-executable instructions and cause the system to:
augment a data schema to include, for each field of a plurality of fields:
an explanation structure for outputs of a machine learning model;
a level of monitoring for the field, wherein the level of monitoring comprises an indication of whether the field is included in one or more computations related to statistical analysis; or
a level of secrecy associated with the field, wherein the level of secrecy comprises one of a public, restricted, sensitive, highly sensitive, or secret level;
retrieve, based on the data schema, a set of fields from an aggregated data set comprising input data that was previously provided to the machine learning model and output data that was previously received from the machine learning model in response to the input data, wherein the set of fields includes one or more input features to the machine learning model and one or more outputs from the machine learning model, wherein the aggregated data set conforms to the data schema;
perform statistical analysis for the machine learning model based on the set of fields retrieved;
predict a level of health of the machine learning model based on the statistical analysis; and
re-train the machine learning model through a supervised learning process using training data that has been updated based on the predicting of the level of health indicating a low level of health for the machine learning model, wherein the supervised learning process comprises:
providing training inputs to the machine learning model,
receiving outputs in response to the training inputs,
comparing the outputs to known labels associated with the training inputs, and
iteratively adjusting parameters of the machine learning model based on the comparing.

9. The system of claim 8, wherein the explanation structure for the outputs of the machine learning model indicates one of:
a set of features contributing most to the outputs of the machine learning model;
a respective set of features contributing most to the outputs of the machine learning model and associated weights of the respective set of features; or
a natural language explanation of the outputs of the machine learning model.

10. The system of claim 8, wherein the level of monitoring for the field indicates an exclusion of the field from monitoring or a set of downstream computations to be excluded for the field in the statistical analysis.

11. The system of claim 8, wherein performing statistical analysis for the machine learning model comprises one or more of:
computing statistical descriptors related to a field having numerical values, wherein the statistical descriptors include a minimum, an average, a maximum, a standard deviation, a skewness, or a kurtosis;
computing category data descriptors related to a field having categorical values, wherein category data descriptors include category frequency; or
computing string data descriptors related to a field having string data, wherein string data descriptors include string length or common words.

12. The system of claim 8, wherein the processor is further configured to execute the computer-executable instructions and cause the system to predict an attribute indicating explainability information related to the machine learning model, wherein the explainability information comprises a global feature importance or a local feature importance.

13. A non-transitory computer readable medium comprising instructions to be executed in a computer system, wherein the instructions cause the system to:
augment a data schema to include, for each field of a plurality of fields:
an explanation structure for outputs of a machine learning model
a level of monitoring for the field, wherein the level of monitoring comprises an indication of whether the field is included in one or more computations related to statistical analysis; or
a level of secrecy associated with the field, wherein the level of secrecy comprises one of a public, restricted, sensitive, highly sensitive, or secret level;
retrieve, based on the data schema, a set of fields from an aggregated data set comprising input data that was previously provided to the machine learning model and output data that was previously received from the machine learning model in response to the input data, wherein the set of fields includes one or more input features to the machine learning model and one or more outputs from the machine learning model, wherein the aggregated data set conforms to the data schema;
perform statistical analysis for the machine learning model based on the set of fields retrieved;
predict a level of health of the machine learning model based on the statistical analysis; and
re-train the machine learning model through a supervised learning process using training data that has been updated based on the predicting of the level of health indicating a low level of health for the machine learning model, wherein the supervised learning process comprises:
providing training inputs to the machine learning model,
receiving outputs in response to the training inputs,
comparing the outputs to known labels associated with the training inputs, and
iteratively adjusting parameters of the machine learning model based on the comparing.

* * * * *